US012675530B2

(12) United States Patent
Stefanini et al.

(10) Patent No.: US 12,675,530 B2
(45) Date of Patent: Jul. 7, 2026

(54) SYSTEMS AND METHODS FOR DYNAMIC MULTIFACETED COMPARISON TOOL

(71) Applicant: Expedia, Inc., Seattle, WA (US)

(72) Inventors: Niccolo Stefanini, Geneva (CH); Michal Kuzba, Geneva (CH)

(73) Assignee: Expedia, Inc., Seattle, WA (US)

( * ) Notice: Subject to any disclaimer, the term of this patent is extended or adjusted under 35 U.S.C. 154(b) by 0 days.

(21) Appl. No.: 18/612,596

(22) Filed: Mar. 21, 2024

(65) Prior Publication Data

US 2025/0298848 A1 Sep. 25, 2025

(51) Int. Cl.
*G06F 16/9038* (2019.01)

(52) U.S. Cl.
CPC ................................. *G06F 16/9038* (2019.01)

(58) Field of Classification Search
CPC .................................................. G06F 16/9038
USPC ........................................................ 707/722
See application file for complete search history.

(56) References Cited

U.S. PATENT DOCUMENTS

| | | | | |
|---|---|---|---|---|
| 11,960,500 | B1 * | 4/2024 | Sboychakova | ......... G06F 40/20 |
| 12,118,984 | B2 * | 10/2024 | Aher | ................... G06F 16/9035 |
| 12,197,452 | B1 * | 1/2025 | Merchant | .............. G06F 16/248 |
| 2005/0086086 | A1 * | 4/2005 | Mack | ..................... G06Q 10/02 |
| | | | | 705/5 |
| 2006/0064410 | A1 * | 3/2006 | Razza | ................... G06F 16/958 |
| 2012/0016678 | A1 | 1/2012 | Gruber et al. | |
| 2017/0154015 | A1 * | 6/2017 | O'Keeffe | ............ G06F 3/04812 |

| | | | | |
|---|---|---|---|---|
| 2018/0218042 | A1 * | 8/2018 | Krishnan | ............ G06F 16/2455 |
| 2018/0349343 | A1 * | 12/2018 | Bull | ....................... G06F 16/243 |
| 2020/0142888 | A1 * | 5/2020 | Alakuijala | ............ G06F 16/242 |
| 2020/0396512 | A1 * | 12/2020 | Nasir | ................ H04N 21/42203 |
| 2021/0073252 | A1 * | 3/2021 | Guo | ....................... G06F 16/383 |
| 2023/0029014 | A1 * | 1/2023 | Lee | ......................... H04L 51/02 |
| 2023/0036167 | A1 | 2/2023 | Yusef | |

(Continued)

FOREIGN PATENT DOCUMENTS

| | | |
|---|---|---|
| CN | 116645243 A | 8/2023 |
| CN | 116934264 | 10/2023 |
| CN | 116934264 A | 10/2023 |

OTHER PUBLICATIONS

Doppler, Daniel C. "The Proper Use of Open AI and CHATGPT in the Hotel Industry", Quicktext. Apr. 20, 2023, 4 pages.

(Continued)

*Primary Examiner* — Cam Linh T Nguyen
(74) *Attorney, Agent, or Firm* — Foley & Lardner LLP

(57) ABSTRACT

A computing system includes a processing circuit having at least one processor coupled to at least one memory device. The processing circuit performs operations including: receiving, from a user device, at least one selected output generated for display via the user device in response to a search query; retrieving information related to the at least one selected output; generating a summary of the at least one selected output based on the retrieved information related to the at least one selected output; and displaying, via a graphical user interface, the summary of the at least one selected output simultaneously with a conversation platform, wherein the conversation platform is configured to enable a conversation between a conversational assistant and a user of the user device relating to the at least one selected output.

18 Claims, 7 Drawing Sheets

(56) References Cited

U.S. PATENT DOCUMENTS

| | | | | |
|---|---|---|---|---|
| 2023/0281230 A1* | 9/2023 | Kukla | ..................... | G06F 16/93 |
| | | | | 707/722 |
| 2024/0202461 A1* | 6/2024 | Pagnoni | ................ | G06F 16/345 |
| 2024/0289407 A1* | 8/2024 | Rofouei | .............. | G06F 16/9577 |
| 2024/0296295 A1* | 9/2024 | Russell | ................... | G06F 40/56 |
| 2024/0354436 A1* | 10/2024 | Mukherjee | .......... | G06F 16/3344 |

OTHER PUBLICATIONS

Murthy, Rathi. "Unlocking the Value of AI and Generative AI in Travel", Medium. Jul. 17, 2023, 6 pages.
International Search Report and Written Opinion dated May 12, 2025, for PCT/US2025/052960.

* cited by examiner

600a

600a

SYSTEMS AND METHODS FOR DYNAMIC MULTIFACETED COMPARISON TOOL

TECHNICAL FIELD

Embodiments and aspects of the present disclosure relate generally to systems and methods for a dynamic multifaceted comparison tool that utilizes artificial intelligence (AI). The tool can be used in a variety of settings/applications, such as comparing travel properties or experiences.

BACKGROUND

Conventionally, there are often several steps a user must take when searching for a travel destination or planning a trip. For example, a user often must manually search for different destinations and excursions separately to search for, plan, and schedule a trip, making it difficult to identify pertinent destinations and other information in a timely and efficient manner. In some instances, a user may desire to find a specific type of property depending on the user's individual needs and preferences, but may not be able to conduct a side-by-side comparison of multiple properties to assess how well each property meets those needs. As a result, increased network occupancy and processing power is required to perform numerous searches to attempt to identify the property that best suits the user's needs and/or preferences. Additionally, users benefit from engaging in a conversation with a virtual agent while they are planning a trip and conducting a search. The virtual agent can provide additional information to the user related to a set of search results, and the user can indicate additional preferences to the virtual agent. The content of the conversation between the user and the virtual agent, however, remains disparate from the search results presented to the user, such that the user is left to synthesize information obtained from the content of conversation with information presented in the search results. Thus, improved technical systems and methods are desired.

SUMMARY

One embodiment relates to a computing system. The computing system may include a network interface configured to communicate with a user device and at least one processing circuit coupled to the network interface, the at least one processing circuit comprising at least one processor and at least one memory, the at least one memory storing instructions therein that, when executed by the at least one processor, cause the at least one processor to: receive, from the user device, at least one selected output, the at least one selected output generated for display via the user device in response to a search query; retrieve information related to the at least one selected output; generate a summary of the at least one selected output based on the retrieved information related to the at least one selected output; and display, via a graphical user interface, the summary of the at least one selected output simultaneously with a conversation platform, wherein the conversation platform is configured to enable a conversation between a conversational assistant and a user of the user device relating to the at least one selected output.

Another embodiment relates to a computer-implemented method. The computer implemented method includes: receiving, by a computing system and from a user device communicably coupled to the computing system, at least one selected output, the at least one selected output generated for display via the user device in response to a search query; retrieving, by the computing system, information related to the at least one selected output; generating, by the computing system, a summary of the at least one selected output based on the retrieved information related to the at least one selected output; and displaying, by the computing system via a graphical user interface, the summary of the at least one selected output simultaneously with a conversation platform, wherein the conversation platform is configured to enable a conversation between a conversational assistant and a user of the user device relating to the at least one selected output.

Still another embodiment relates to a non-transitory computer-readable medium having instructions embodied therein that, when executed by at least one processor of a provider computing system, cause the provider computing system to perform operations. The operations include: receiving, from a user device, at least one selected output, the at least one selected output generated for display via the user device in response to a search query; retrieving information related to the at least one selected output; generating a summary of the at least one selected output based on the retrieved information related to the at least one selected output; and displaying, via a graphical user interface, the summary of the at least one selected output simultaneously with a conversation platform, wherein the conversation platform is configured to enable a conversation between a conversational assistant and a user of the user device relating to the at least one selected output.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Figure 1:
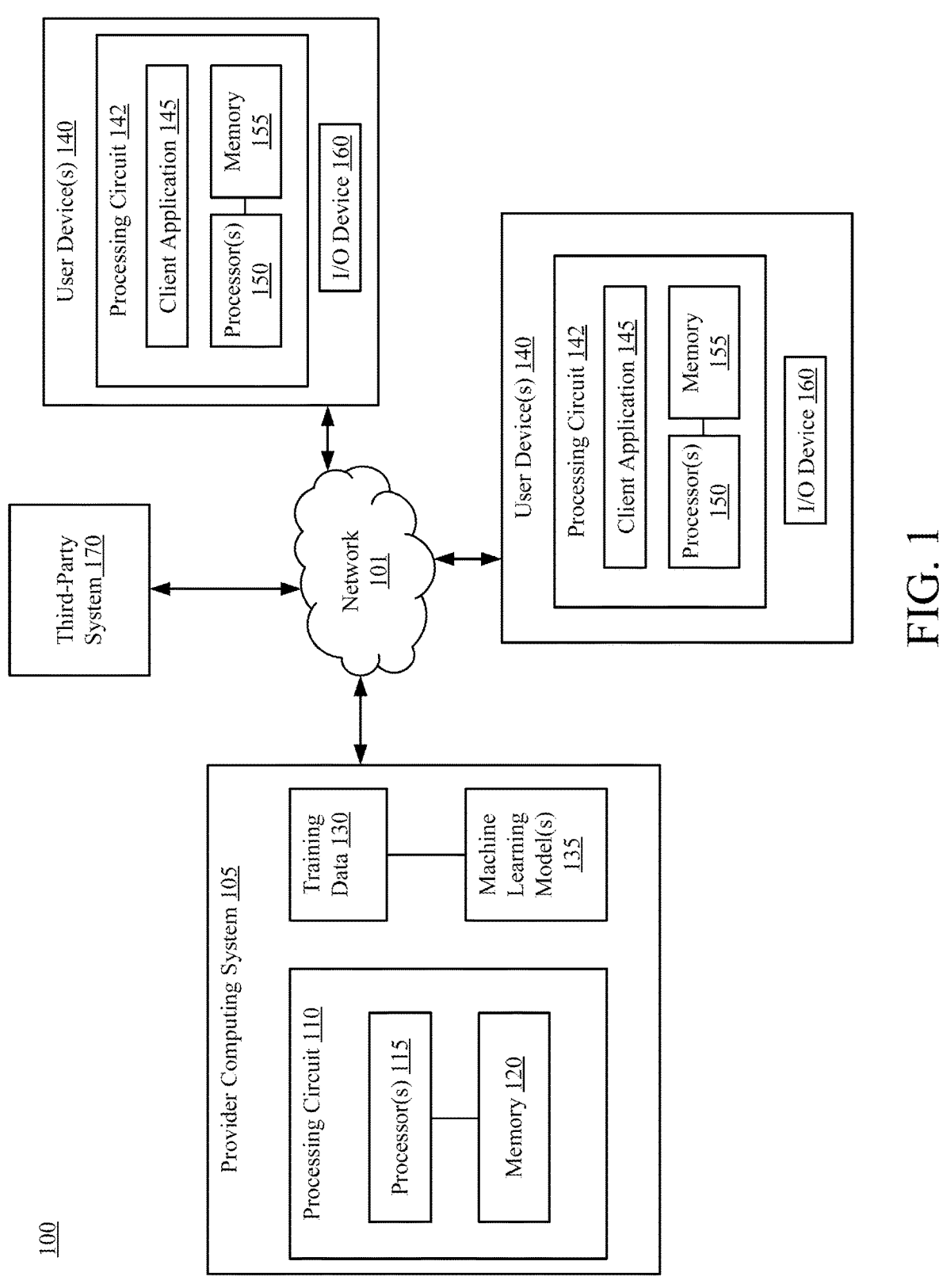
FIG. 1 depicts a block diagram of a system for facilitating, enabling, generating, and providing dynamic multifaceted comparisons (of, e.g., travel properties), according to an example embodiment.

Below are detailed descriptions of various concepts related to and implementations of techniques, approaches, methods, apparatuses, and systems for facilitating, enabling, generating, and providing dynamic multifaceted comparisons (of, e.g., travel properties). In particular, the systems, methods, apparatuses, and computer-readable described herein relate to a multifaceted dynamic comparator or comparison tool that may be used in real-time to enable comparison (e.g., of travel properties, travel experiences, etc.) in a non-conventional manner by linking interactions of a bot (e.g., a chat bot) with a comparison table to provide more detailed sources of information for users to reduce an amount of search queries (thereby reducing bandwidth occupancy and increasing processing speed) and improve a search interface useable for comparing multiple objects or things. With the dynamic multifaceted comparison tool described herein, a user can add and/or update parameters related to a search without having to initiate a new search by submitting one or more additional search queries. The various concepts introduced above and discussed in detail below may be implemented in any of numerous ways, as the described concepts are not limited to any particular manner of implementation. Examples of specific implementations and applications are provided primarily for illustrative purposes.

Referring generally to the Figures, aspects and embodiments of the present disclosure relate to systems, computer-readable media, and methods that improve conventional computers and, specifically, electronic networked search processes. The systems, computer-readable media, and methods improve electronic searches (e.g., searches for content, such as travel experiences) by generating and providing improved graphical user interfaces using various machine learning methods. More specifically, the present disclosure relates to systems, apparatuses, computer-readable media, and methods for receiving at least one selected output (e.g., a travel property) based on a search query (e.g., a search query for a travel property), retrieving information related to the at least one selected output (e.g., a price, review data, a geographical location, one or more amenity offerings, etc.), generating a summary of the at least one selected output based on the retrieved information, and displaying the summary of the at least one selected output simultaneously with a conversation platform via a user interface of a user device. A conversation between a conversational assistant and a user of the user device via the conversation platform displayed on the user interface may be provided and enabled. In operation, a content of the conversation between the conversational assistant and the user may be detected using at least one machine learning model. In response, the depicted summary may dynamically change to reflect the content of the conversation in real-time. This real-time or near real-time change may enable providing more desirable information to a user in a quicker manner, and alleviate the user from making multiple searches to obtain or attempt to obtain such information.

Within the context of searching for travel experiences (e.g., properties, etc.), beneficially, by allowing travelers and other users to view a summary of one or more travel experiences and engage in a conversation with a conversational assistant via a same user interface, the systems, apparatuses, computer-readable media, and methods described herein provide an efficient and interactive way to search for a property that may decrease network occupancy and reduce a time required to identify and book one or more travel properties. Typically, a user must provide a plurality of searches to identify, assess, and book a travel property. The number of searches multiplies when the user receives new information from a virtual agent or realizes additional parameters they would like to include in their search query. Often, users will have individual needs that need to be met with regard to a travel experience. For example, a user may require a travel property to be accessible to those with disabilities. As another example, if a user is travelling for a business trip, the user may require a travel property to be in close proximity to a specific office building. When it comes to trip planning, every user has their own unique needs. These unique needs can be difficult to capture using pre-determined parameters that are available when the user submits a search query. In turn, the user spends significant amounts of time performing internet searches trying to identify properties that meet their individual needs and circumstances, which occupies bandwidth and processing power all while occupying the user's time.

The systems, apparatuses, computer-readable media, and methods described herein provide a technical solution to at least the technical problem of excessive and/or unfocused searches by generating a summary of at least one selected output based on retrieved information related to the at least one selected output, displaying the summary simultaneously with a conversation platform, and updating the summary based on a detected content of a conversation between a user and a conversational assistant via the conversation platform. In this regard, a non-conventional atypical search system, method, and apparatus is provided. In operation, the number of searches may decrease, which may result in drastically improved time savings as well as bandwidth savings. The systems, computer-readable media, and methods described herein may leverage outputs of at least one machine learning model to reduce the number of inputs necessary to identify a travel experience that meets a user's individual needs, thereby reducing an amount of time it takes to plan a trip while increasing processing power of a computing system. Additionally, using the content from a conversation between a user and a conversational assistant, the systems, computer-readable media, and methods described herein are configured to present search results based on individual needs and circumstances that are otherwise difficult for a user to capture using conventional search parameters.

The systems, computer-readable media, and methods described herein are further configured to generate improved graphical user interfaces that depict a summary page (e.g., a table) and the conversation platform simultaneously such that information included on the summary page updates in real-time to reflect the content of the conversation between the user and the conversational assistant. That is, the improved graphical user interface combines two disparate features, the summary page and the conversation platform, within a single interface. Simultaneous viewing of and interaction with the summary page and the conversation platform, respectively, enables a richer interaction with the user, beyond either information related to the summary page or information presented through the conversation platform alone. Systems, computer-readable media, and methods described herein offer a non-conventional approach by including both the summary page and the conversation platform on a single user interface and by updating the summary page in response to a conversation over the conversation platform. These and other features and benefits are described more fully herein below.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

FIG. 1 illustrates an example system 100 for facilitating, enabling, generating, and providing a dynamic multifaceted comparison tool, according to an example embodiment. The system 100, or parts thereof, may be configured to facilitate intelligent comparisons associated with traveling and/or trip planning (e.g., hotels, resorts, rental properties, etc.). It should be understood that while the dynamic multifaceted comparison tool described herein is used within the context of travel comparisons, the principles described herein may be applied to other settings as well (e.g., car comparisons, bank comparisons, pediatrician comparisons, and so on). Thus, the technological solutions of the instant disclosure may be applicable in a variety of contexts, such that the travel context is not meant to be limiting.

The system 100 includes a provider computing system 105 coupled to one or more user devices 140 and one or more third party systems 170 via a network 101. The provider computing system 105 may be a computing system associated with a provider entity. The provider organization or entity may be a provider of goods and/or services. In this example, the provider entity is a travel services/experiences provider, such as a travel agency, which provides and maintains one or more accounts on behalf of the user. The provider may be or enable bookings/reservations with a transportation provider (e.g., airline, car service, etc.), a lodging provider (e.g., hotel, rental property, cruise, etc.), an experience provider (e.g., theme parks, concerts, shows, events, excursions, etc.), or any combination thereof. In the example shown, the provider is a travel or experience booking agency that provides or enables a variety of experiences by interfacing/communicating with other providers (e.g., lodging providers, airline providers, etc.).

The provider computing system 105 is structured as one or more backend computing systems comprising one or more servers and other computing components. The provider computing system 105 can store training data 130. The provider computing system 105 includes one or more machine learning models 135 that can be trained using the training data 130, as described in greater detail herein. For example, the at least one machine learning model 135 may be trained to parse a text entry received via a conversation platform, determine a meaning of the parsed text, and detect a content of the conversation based on the meaning of the parsed text, as described in greater detail herein. Although shown as internal to the provider computing system 105, it should be understood that the training data 130 may be stored external to the provider computing system 105 that is in communication with the provider computing system 105 via the network 101.

Each component (e.g., the provider computing system 105, the network 101, the machine learning models 135, the user devices 140, the third party systems 170, etc.) of the system 100 can be implemented using the hardware components or a combination of software with the hardware components of any computing system described herein. Each component of the provider computing system 105 can perform one or more of the functionalities detailed herein.

The provider computing system 105 can include at least one processing circuit 110, which may, as an example, include at least one processor 115 and at least one memory 120. The provider computing system 105 may include one or more servers that include one or more of the processors and/or memory components described above and herein. The memory 120 can store computer-executable instructions that, when executed by the processor 115, cause the processor 115 to perform one or more of the operations described herein. The processor 115 may include a microprocessor, an application-specific integrated circuit (ASIC), a field-programmable gate array (FPGA), a graphics processing unit (GPU), a tensor processing unit (TPU), etc., and/or combinations thereof. The memory 120 may include, but is not limited to, electronic, optical, magnetic, or any other storage or transmission device capable of providing the processor with program instructions. The memory 120 may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The provider computing system 105 can include one or more computing devices or servers that can perform various of the operations or functions described herein.

Although not shown in FIG. 1, the provider computing system 105 can include a network interface. In some instances, the network interface includes, for example, program logic and any associated hardware components (e.g., transceivers, ethernet cards, etc.) that connects the provider computing system 105 to the network 101. The network interface facilitates communications between the provider computing system 105 and each of the user device(s) 140 and third party system(s) 170. The network interface also facilitates communication with other entities, such as other providers of goods and/or services. The network interface further includes user interface program logic configured to generate and present web pages to users accessing the provider computing system 105 over the network 101.

The network 101 can include packet-switching computer networks such as the Internet, local, wide, metro, or other area networks, intranets, satellite networks, other computer networks such as voice or data mobile phone communication networks, or combinations thereof. The provider computing system 105 of the system 100 can communicate via the network 101 with one or more computing devices, such as the one or more user devices 140 and the one or more third party systems 170. The network 101 may be any form of computer network that can relay information between the provider computing system 105, the one or more user devices 140, the one or more third party systems 170, and one or more information sources, such as web servers or external databases, amongst others. In some implementations, the network 101 may include the Internet and/or other types of data networks, such as a local area network (LAN), a wide area network (WAN), a cellular network, a satellite network, or other types of data networks. The network 101 may also include any number of computing devices (e.g., computers, servers, routers, network switches, etc.) that are configured to receive or transmit data within the network 101.

The network 101 may include any number of hardwired or wireless connections. Any or all of the computing devices described herein (e.g., the provider computing system 105, the one or more user devices 140, the one or more third party systems 170, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 101. Any or all of the computing devices described herein (e.g., the provider computing system 105, the one or more user devices 140, the one or more third party systems 170, etc.) may also communicate wirelessly with the computing devices of the network 101 via a proxy device (e.g., a router, network switch, or gateway). In some embodiments, a wired or a combination of wired and/or wireless connections may be used to enable communicable coupling.

The system 100 is shown to include a plurality of user devices 140. The user devices 140 can include one or more computing devices that can perform various operations as described herein. For example, in some implementations, the user device 140 may be or may include, for example, a desktop or laptop computer (e.g., a tablet computer), a smartphone, a wearable device (e.g., a smartwatch), a personal digital assistant, and/or any other suitable computing device. In the example shown, the user device 140 is structured as a mobile computing device, namely a smartphone.

Each of the user devices 140 can include at least one processing circuit 142, which may, as an example, include at least one client application (e.g., client application 145), at least one processor (e.g., processor(s) 150), and at least one memory (e.g., memory 155). In some implementations, one or more of the user devices 140 can access various functions of the provider computing system 105 through the network 101. For example, the user device 140 can access one or more functions of the provider computing system 105 via the client application 145 of the user device 140 that is configured to display various user interfaces to the user device 140 via the network 101. As described in greater detail herein, a user of the user device 140 can select at least one output within the client application 145 of the user device 140 (e.g., via at least one output to a user interface of the user device 140). The provider computing system 105 can determine, using the one or more trained machine learning models 135, an output based on the at least one selected output and render responses on the user device 140 via the client application 145.

The client application 145 can be coupled to and supported, at least partly, by the provider computing system 105. For example, in operation, the client application 145 can be communicably coupled to the provider computing system 105 and may perform certain operations described herein, such as receiving at least one selected output and generating one or more user interfaces including information associated with the at least one selected output that is displayed on a user device 140. In some embodiments, the client application 145 includes program logic stored in a system memory (e.g., memory 155) of the user device 140. In such arrangements, the program logic may configure a processor (e.g., processor(s) 150) of the user device 140 to perform at least some of the functions discussed herein with respect to the client application 145 of the user device 140. In the example shown, the client application 145 may be downloaded from an application store, stored in the memory 155 of the user device 140, and selectively executed by the processor(s) 150. In other embodiments, the client application 145 may be hard-coded into the user device 140. In still various other embodiments, the client application 145 is a web-based application. As alluded to above, the client application 145 may be provided by the provider associated with the provider computing system 105 such that the client application 145 supports at least some of the functionalities and operations described herein with respect to the provider computing system 105. In this way, the client application 145 may also be referred to as a provider institution client application or provider client application. In some embodiments, the client application 145 may be accessed and executed by the processor(s) 150 responsive to receiving various credentials of a user to access the client application 145 (e.g., a username, a password, a pin code, a biometric such as a facial scan or a fingerprint, a combination thereof, etc.).

In some instances, the client application 145 may additionally be coupled to the third party system(s) 170 (e.g., via one or more application programming interfaces (APIs) and/or software development kits (SDKs)) to integrate one or more features or services provided by the third party system(s) 170. In some instances, the third party system(s) 170 may alternatively and/or additionally provide services via a separate client application 145.

The processor 150 can include a microprocessor, an ASIC, an FPGA, a GPU, a TPU, etc., or combinations thereof. The memory 155 can store processor-executable instructions that, when executed by the processor(s) 150, cause the processor(s) 150 to perform one or more of the operations described herein. The memory 155 can include, but is not limited to, electronic, optical, magnetic, or any other storage or transmission device capable of providing the processor with program instructions. The memory 155 can further include a memory chip, ROM, RAM, EEPROM, EPROM, flash memory, optical media, or any other suitable memory from which the processor 150 can read instructions. The instructions can include code from any suitable computer programming language.

The user device 140 is further shown as including an I/O device 160. The I/O device 160 can include various components for receiving inputs, providing outputs, or receiving and providing inputs and outputs, respectively, to a user of the user device 140. For example, the I/O device 160 can include a display screen such as a touchscreen, a mouse, a button, a keyboard, a microphone, a speaker, an accelerometer, actuators (e.g., vibration motors), any combination thereof, etc. The I/O device 160 may also include circuitry/programming/etc. for operating such components. The I/O device 160 thereby enables communications to and from a user, for example communications relating to travel recommendations as described in further detail herein.

Although not shown in FIG. 1, the user device 140 may include a network interface. The network interface includes, for example, program logic and various devices (e.g., transceivers, etc.) that connect the user device 140 to the network 101. The network interface facilitates communications between the user device 140 and each of the provider computing system 105 and/or the third party system 170. The network interface also facilitates communication with other entities, such as other providers of goods and/or services.

The system 100 is shown to include the third party system 170 (although only one is shown, there could be a plurality). The third party system 170 (e.g., third party computing system, third party device, etc.) may be a third party relative to the provider, and be associated with a third party entity. For example, the third party entity may be or may include various goods and/or services provider entities including, but not limited to, a transportation provider (e.g., airline, car service, etc.), a lodging provider (e.g., hotel, rental property, cruise, etc.), an experience provider (e.g., theme parks, concerts, shows, events, excursions, etc.), or any combination thereof. The provider computing system 105 may communicate with the third party computing system 170 to make bookings and reserve experiences on behalf of the traveler/user. The third party system 170 includes a respective network interface to facilitate exchanging data with the provider computing system 105 and/or the user device 140 through the network 101. The third party system 170 may include one or more servers. The third party system 170 may include one or more APIs and/or SDKs associated with the third party entity for exchanging data with the provider computing system 105 and/or the user device 140, as described herein.

Figure 2:
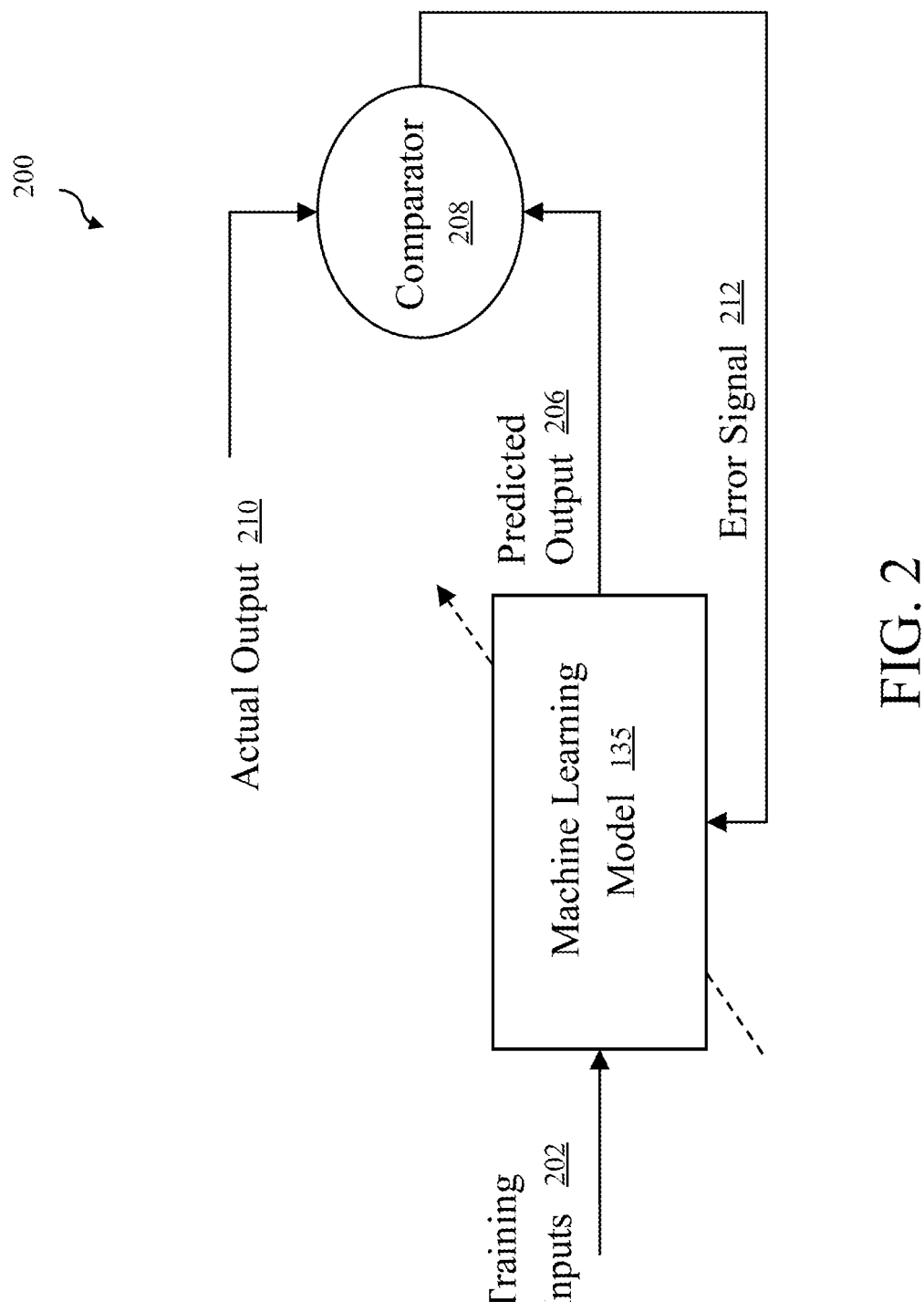
FIG. 2 depicts a block diagram of an artificial intelligence (AI) sub-system of FIG. 1, according to an example embodiment.
Figure 3:
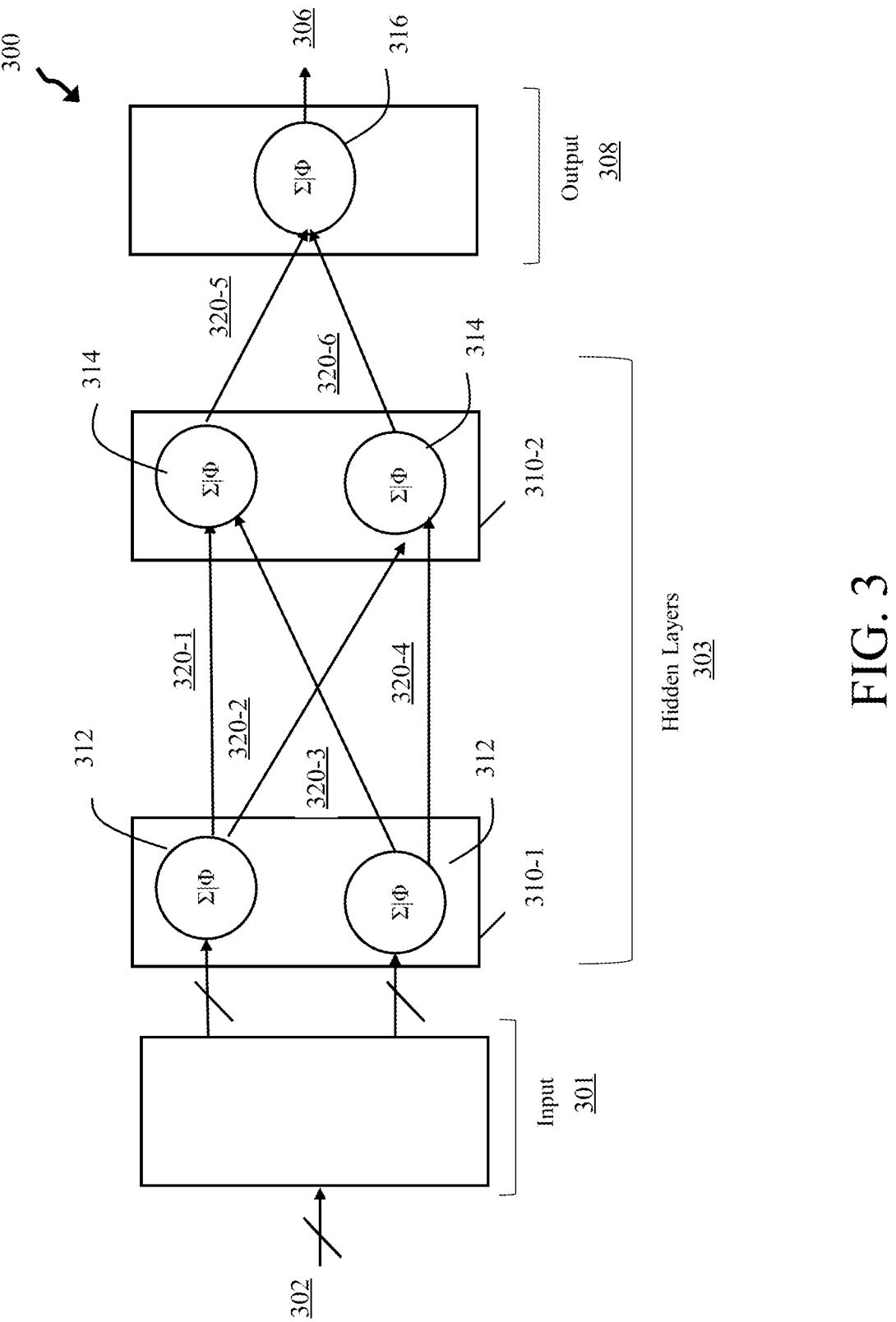
FIG. 3 depicts a block diagram of an AI model of the AI sub-system of FIG. 1, according to an example embodiment.

The machine learning model 135 may be structured to recognize patterns, trends, and the like in data and make one or more determinations. For example, FIGS. 2 and 3 represent example structures of the machine learning model 135. With reference to FIG. 2, a block diagram of an example system 200 using supervised machine learning is shown. Supervised learning is a method of training a machine learning model (e.g., machine learning model 135) given input-output pairs (e.g., stored in the training data 130). An input-output pair is an input with an associated known output (e.g., an expected output). The machine learning model 135 may be trained on known input-output pairs (e.g., the training data 130) such that the machine learning model 135 can learn how to predict known outputs given known inputs. Once the machine learning model 135 has learned how to predict known input-output pairs, the machine learning model 135 can operate on unknown inputs to predict an output.

The machine learning model 135 may be trained based on general data and/or granular data (e.g., data based on a specific user) such that the machine learning model 135 may be trained specific to a particular user. Training inputs 202 and actual outputs 210 may be provided to the machine learning model 135. For example, as described in greater detail herein, training inputs 202 may include images, captions to describe the images, audio data, textual transcriptions of the audio data, metadata, user account data, and/or other data stored in the provider computing system 105. Actual outputs 210 may include captions, traveler data, and/or property data. The training inputs 202 and the actual outputs 210 may be received from the training data 130. For example, the training data 130 may contain various datasets including the images and/or other medias, captions, audio data, textual transcriptions, metadata, traveler data, property data, etc., as described herein.

In operation, the machine learning model 135 may use various training inputs 202 to determine and, particularly, predict various outputs 206, by applying the current state of the machine learning model 135 to the training inputs 202. The comparator 208 may compare the predicted outputs 206 to actual outputs 210 to determine an amount of error or differences. For example, the predicted, determined, and/or generated property information (predicted output 206) may be compared to the actual property data stored in the provider computing system 105 (actual output 210). In other words, the actual outputs 210 may be based on historical data of property information provided to a user of the user device 140 in response to a search query and stored in the training data 130.

During training, the error (represented by error signal 212) determined by the comparator 208 may be used to adjust the weights in the machine learning model 135 such that the machine learning model 135 changes (or learns) over time. The machine learning model 135 may be trained using a backpropagation algorithm, for instance. The backpropagation algorithm operates by propagating the error signal 212. The error signal 212 may be calculated each iteration (e.g., each pair of training inputs 202 and associated actual outputs 210), batch and/or epoch, and propagated through the algorithmic weights in the machine learning model 135 such that the algorithmic weights adapt based on the amount of error. The error is minimized using a loss function. Non-limiting examples of loss functions may include the square error function, the root mean square error function, and/or the cross-entropy error function.

The weighting coefficients of the machine learning model 135 may be tuned to reduce the amount of error, thereby minimizing the differences between (or otherwise converging) the predicted output 206 and the actual output 210. The machine learning model 135 may be trained until the error determined at the comparator 208 is within a certain threshold (or a threshold number of batches, epochs, or iterations have been reached). The trained machine learning model 135 and associated weighting coefficients may subsequently be stored in memory or other data repository (e.g., a database) such that the machine learning model 135 may be employed on unknown data (e.g., not training inputs 202). Once trained and validated, the machine learning model 135 may be employed during a testing (or an inference phase). During testing, the machine learning model 135 may ingest unknown data to predict future data.

In some embodiments, the machine learning model 135 may include at least one generative artificial intelligence (AI) model. The at least one generative AI model may include, but is not limited to, a large language model (LLM), which can be trained to generate human-like text, speech, images, and/or components of graphical user interfaces (e.g., components of user interface 600a and/or user interface 600b, as described below with reference to FIGS. 6A and 6B, respectively). The at least one generative AI model may be a deep learning architecture that includes a multitude of interconnected layers, including attention mechanisms, self-attention layers, and transformer blocks. The at least one generative AI model is trained on large datasets to assimilate patterns, structures, and relationships within the data. The trained at least one generative AI model can be trained to generate outputs that closely resemble the characteristics of the input data. The at least one generative model may be fine-tuned to generate specific output data, including data that is compatible with various database architectures or augmented reality systems. The at least one generative AI model can be trained via optimization of a large number of parameters, in which the at least one generative AI model learns to minimize the error between its predictions and the actual data points, resulting in highly accurate and coherent generative capabilities.

In the specific context of LLMs, the at least one generative AI model can operate through a process of tokenization, wherein input text (e.g., a textual input submitted by a user via input field 615, as described below) is divided into individual tokens that represent words or sub-word units. The generated tokens are then embedded into a high-dimensional vector space, which enables the at least one generative model to capture and encode the semantic and syntactic relationships among the tokens. The transformer architecture facilitates the simultaneous processing of these tokens, effectively capturing dependencies and relationships across different parts of the input sequence. Self-attention mechanisms enable the at least one generative model to weigh the importance of each token in relation to others within the context, refining the representation of the input text data. Upon generating the output, the model selects tokens sequentially based on the highest probability of occurrence, as determined by learned relationships in the training data 130.

The at least one generative AI model may include a number of output layers (e.g., output layer 308, as described below with reference to FIG. 3) that are fine-tuned to specific applications. For example, the output of one or more of the at least one generative AI model can be controlled and guided during a fine-tuning process by introducing task-specific loss functions or constraints, which may be utilized to optimize and specify particular application-specific outputs of the at least one generative AI model. In some implementations, one or more of the at least one generative AI model may be trained using a fine-tuning process to automatically generate database entries or to automatically identify relevant database entries for users based on text input (e.g., a textual input submitted by a user via input field 615 of user interfaces 600*a* and/or 600*b*). For example, the one or more of the at least one generative AI model may be utilized to identify or otherwise generate instructions to retrieve data from one or more databases corresponding to user data (e.g., user data stored in at least one of the memory 120, the training data 130, the client application 145, and/or the memory 155, as described herein) associated with a particular user. One or more of the at least one generative AI model may also be fine-tuned to generate, or otherwise select, presentation formats that may be utilized to generate graphical user interfaces (e.g., user interface 600*a* and/or user interface 600*b*) to display information retrieved from different databases or storage media described herein.

In some embodiments, the at least one generative AI model of the system 200 can be accessed, for example, by the provider computing system 105, the user device(s) 140, and/or the third-party system 170 using at least one communications application programming interface (API). The provider computing system 105 can maintain and provide the at least one communications API. The at least one communications API can be any type of API, such as a web-based API corresponding to a particular network address uniform resource identifier (URI), or uniform resource locator (URL), among others. The at least one communications API can be accessed, for example, by one or more of the provider computing system 105, the user device(s) 140, and/or the third-party system 170, via the network 101. The at least one communications API can be a client-based API, a server API (SAPI), or an Internet Server API (ISAPI). Various protocols may be utilized to access the at least one communications API, including a representational state transfer (REST) API, a simple object access protocol (SOAP) API, a Common Gateway Interface (CGI) API, or extensions thereof. The at least one communications API may be implemented in part using a network transfer protocol, such as the hypertext transfer protocol (HTTP), the secure hypertext transfer protocol (HTTPS), the file transfer protocol (FTP), the secure file transfer protocol (FTPS), each of which may be associated with a respective URI or URL.

With reference to FIG. 3, a block diagram of a simplified neural network model 300 is shown, according to an example embodiment. The neural network model 300 may include a stack of distinct layers (vertically oriented) that transform a variable number of inputs 302 being ingested by an input layer 301, into an output 306 at the output layer 308.

The neural network model 300 may include a number of hidden layers 310 between the input layer 301 and the output layer 308. Each hidden layer has a respective number of nodes (312, 314 and 316). In the neural network model 300, the first hidden layer 310-1 has nodes 312, and the second hidden layer 310-2 has nodes 314. The nodes 312 and 314 perform a particular computation and are interconnected to the nodes of adjacent layers (e.g., nodes 312 in the first hidden layer 310-1 are connected to nodes 314 in a second hidden layer 310-2, and nodes 314 in the second hidden layer 310-2 are connected to nodes 316 in the output layer 308). Each of the nodes (312, 314 and 316) sums up the values from adjacent nodes and applies an activation function, allowing the neural network model 300 to detect nonlinear patterns in the inputs 302. Each of the nodes (312, 314 and 316) is interconnected by weights 320-1, 320-2, 320-3, 320-4, 320-5, 320-6 (collectively referred to as weights 320). Weights 320 are tuned during training to adjust the strength of the node. The adjustment of the strength of the node facilitates the neural network's ability to predict an accurate output 306.

In some embodiments, the output 306 may be one or more numbers. For example, output 306 may be a vector of real numbers subsequently classified by various one or more of any classifiers. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As, such the softmax classifier may be employed because of the classifier's ability to classify various classes. Other classifiers may be used to make other classifications. For example, the sigmoid function makes binary determinations about the classification of one class (i.e., the output may be classified using label A or the output may not be classified using label A).

It is noted that various other forms of classifiers may be implemented or used in the present disclosure (e.g., in the machine learning model 135). For example, the machine learning model 135 described herein may include or use a support vector machine, random forest, K-nearest neighbors, naïve bayes, or any other type or form of classifier.

Figure 4:
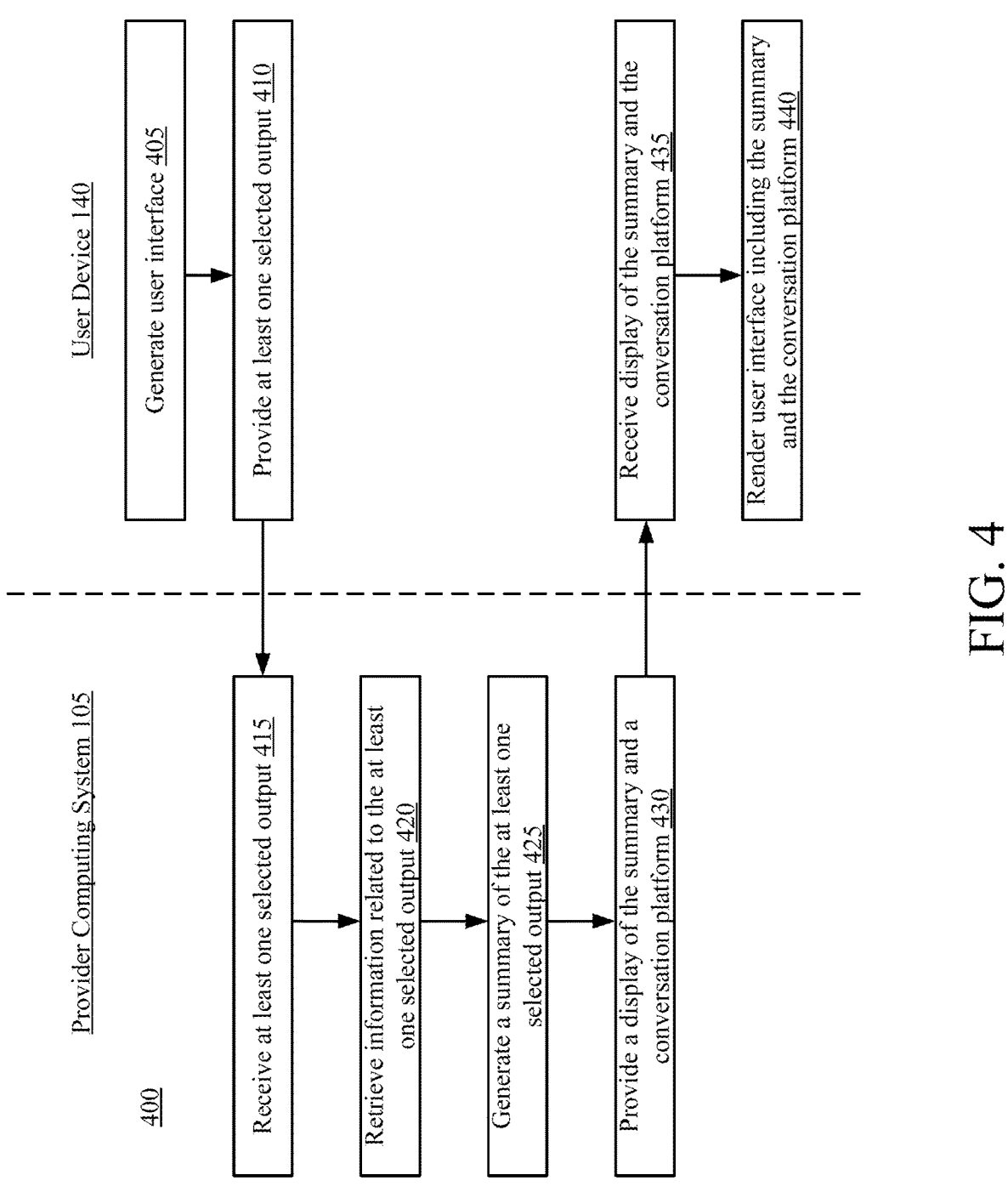
FIG. 4 depicts a method of providing a dynamic multifaceted comparison tool with the system of FIG. 1, according to an example embodiment.

Based on the foregoing, referring now to FIG. 4, a flowchart of a method 400 of providing the dynamic multi-faceted comparison tool is shown, in accordance with one or more implementations. Although the operations of the method 400 are described as being performed by portions of a system (e.g., the provider computing system 105, the user device 140, and/or the third party system 170), it should be understood that the method 400 may be executed using any suitable computing system (e.g., the provider computing system 105 of FIG. 1, the user device 140 of FIG. 1, the third party system 170 of FIG. 1, etc.). It may be appreciated that certain steps of the method 400 may be executed in parallel (e.g., concurrently) or sequentially. It may also be appreciated that while certain acts of the method 400 are shown as being performed by a specific device, some acts may be performed by another device of the system 100 in FIG. 1.

Although not shown in FIG. 4, the method 400 may begin when a user accesses the client application 145 (e.g., via the user device 140). The user may log into the client application 145 by submitting one or more credentials (e.g., a username, a password, a pin code, a biometric such as a facial scan or a fingerprint, a combination thereof, etc.). Upon receiving the one or more credentials via the user device 140, the provider computing system 105 may be configured to grant the user access to the client application 145. Alternatively, the client application 145 may store authorized credentials and not communicate with the provider computing system

105 in order to grant access to the client application 145 and its associated functionality. By associating the user with the account using the one or more credentials, the provider entity may be configured to retrieve account information (e.g., personal information, past travel history, etc.) and personalize the results of a search session based on the unique account information associated with the user. Once the user receives access to the client application 145, the user may submit a search query for one or more goods and/or service (e.g., one or more travel experiences, etc.). Although the method 400 is described in the context of a search for one or more travel experiences, the method 400 may be utilized to conduct a comparison of any goods/ services offered, provided, sold, or otherwise available (e.g., one or more offerings of an e-commerce platform such as clothing, books, other retail items; a comparison tool for vehicles; a comparison tool for real property and dwellings; etc.) Alternatively or additionally, the user may submit the search query upon accessing a website operated by the provider entity (e.g., by typing in a domain name associated with the website, clicking a hyperlink to the domain name, etc.) through any established communications protocol and not log-in. In this latter embodiment, traveler-specific information (e.g., that may be stored by the provider entity in an account associated with the traveler) may not be utilized or utilized later to generate personalized travel recommendations.

The method 400 may include act, operation, or process 405 in which the user device 140 generates and provides a user interface via the I/O device 160. The user device 140 may generate the user interface in response to the user successfully logging into the client application 145. In some embodiments, the user interface may include a search field in which the user may be configured to enter a search query and initiate a search session. The search session refers to a user interaction with the provider entity during which the user receives one or more travel experience recommendations from the provider entity in response to the search query or multiple search queries entered/provided by the user. The search query refers to a search for content, and may be received via a variety of modalities (e.g., textually, audibly, etc.). With the dynamic multifaceted comparison tool described herein, the user may add parameters to an initial search query and receive additional information related to the one or more goods and/or service recommendations received from the provider entity without having to submit additional search queries relative to the initially provided query and/or initiate a new search session. But, refinement may occur based on the initial search query.

The search query may include one or more (i.e., a first one or more of) configurable parameters defined by the user. Although the user may define the one or more configurable parameters in the search query, the user may also define the one or more configurable parameters by interacting with a conversation platform related to the search session, as described herein, and without having to enter one or more additional search queries related to the one or more configurable parameters. In other words, a first search query (e.g., "Trips to India") may be received. A first amount of results may be received and subsequently, via the conversation platform, additional data and filtering may occur with respect to the first amount of results. Thus, only one search query may be utilized thereby reducing time and processing speed with implementing multiple search queries. The first one or more configurable parameters refer to parameters or constraints for the search query. Thus, the one or more configurable parameters for the search query may include, but are not limited to, a party size, a geographical region of interest, a property-type of interest (e.g., hotel, motel, all-inclusive resort, etc.), a timeframe of a trip, a price range associated with one or more aspects of a trip (e.g., an airline price, a lodging price, an overall total price, etc.), one or more amenity offerings, and so on. The party size refers to a number of travelers included in a trip associated with the user's search query. For example, if the user is searching for a travel property via the client application 145, the user may indicate that two adults and four children will be going on the trip. The geographical region refers to a location to which the user is traveling. For example, the geographical region may include a country (e.g., England), a state (e.g., Florida), a city (e.g., New York City), a neighborhood (e.g., Brooklyn), etc. The user may indicate a radius (e.g., 5 miles, 10 miles, 25 miles, 100 miles, etc.) surrounding the geographical region to which the user may be willing to extend the search query. For example, if a user specifies a search for travel properties in Brooklyn using one of the configurable parameters, the user may further specify that the results may extend to a 5-mile radius surrounding the Brooklyn area. In some embodiments, the user may choose to omit a geographical region in the initial search query, in which case the search results are not bound to any geographical restraint.

The property type refers to a type of property for which the user is searching. For example, the user may indicate that they are searching for an all-inclusive resort, a hotel room, a rental home, a motel, a condominium, etc. The timeframe refers to a duration of time during which the user will be traveling (and, particularly, a duration of stay in various lodges associated with a trip). For example, the user may indicate a specific date range (e.g., March 4 through March 7), a week (e.g., first week in February), a month (e.g., March), a season (e.g., summer), a calendar year (e.g., 2025), and so on. The price range refers to a preferred range that the user is willing to pay for a travel experience and/or part thereof (e.g., a maximum lodge cost). For example, the price range may include a cost per night (e.g., $200-$400 per night), a total cost for the trip (e.g., $1,000-$2000 for two people for five nights), a price per person (e.g., $500-$1,000 per person), a price per person per night ($100-$400 per person per night), and so on. The one or more amenity offerings refers to one or more specific features that the user seeks in a travel experience. For example, the one or more amenity offerings may include a fitness center, a pool, a waterpark, beach access, tennis courts, parking, and so on.

In response to the search query, the provider computing system 105 may present one or more results to the user via the user interface. The one or more results may include a list (e.g., a textual list, an array of images, etc.) of travel experiences that meet one or more criteria defined by the configurable parameters included in the search query. The one or more criteria may include the party size, the geographical region, the property-type, the timeframe, the price range, the one or more amenity offerings, and so on. In some embodiments, the provider computing system 105 identifies the one or more results by identifying one or more travel experiences stored in a database of the provider computing system 105 that are tagged with one or more features corresponding to the criteria indicated by the configurable parameters in the search query. The provider computing system 105 may, for each of the travel experiences stored in the database of the provider computing system 105, associate one or more data tags (e.g., a label, an identifier, metadata, etc.) with the travel experience. The one or more data tags represent a feature, element, detail, or other piece of information corresponding to the travel experience. For example, for an all-inclusive resort in Orlando, the provider computing system 105 may associate a data tag representing the property type as resort, the location as Orlando, one or more amenities as an all-inclusive package, and so on. Then, when the provider computing system 105 receives one or more criteria defined by the configurable parameters of a search query (e.g., "provide me with all-inclusive resort options in Orlando"), the provider computing system 105 can identify one or more travel experiences stored in the database that have data tags corresponding to the one or more criteria. For example, if a search query requests beach-front hotels in Miami, the provider computing system 105 may identify one or more travel experiences stored in the database that have data tags indicating a location in Miami, a beach-front property, and a property-type of hotel. The provider computing system 105 will then present these one or more travel experiences as the one or more results via the user interface. From the one or more results, the user may select (e.g., via the I/O device 160 of the user device 140) at least one of the one or more travel experiences. In some embodiments, the user may save the selected one or more travel experiences to the user account within the client application 145.

The method 400 may include act, operation, or process 410, in which the user device 140 (e.g., via the one or more processor(s) 150) provides at least one selected output to the provider computing system 105. In some embodiments, the at least one selected output may be one or more travel experiences presented in response to a search query and saved during a search session. That is, the user conducts a search for a travel experience, receives results, selects a subset of the results, and engages with a compare tool option on the user interface to provide the subset of the results to the provider computing system 105. The at least one selected output may be generated for display via a user interface of the user device 140 (e.g., as the one or more results to a search query, as described above). In some embodiments, the at least one selected output relates to a travel experience. For example, the at least one selected output may include a property page associated with a hotel in Miami that a user previously saved to the user's account within the client application 145 during a search session for hotels in Miami. The method 400 may include act, operation, or process 415, in which the provider computing system 105 receives the at least one selected output from the user device 140.

The method 400 may include act, operation, or process 420, in which the provider computing system 105 retrieves information related to the at least one selected output. The provider computing system 105 may retrieve the information related to the at least one selected output from one or more data sources. In some embodiments, the provider computing system 105 may retrieve the information related to the at least one selected output from an internal data source. The internal data source refers to one or more data sources accessible within the provider computing system 105 and associated with the provider entity. In some embodiments, the provider computing system 105 may retrieve the information related to the at least one selected output from an external data source. The external data source refers to a third party data source relative to the provider computing system 105. For example, the external data source may include one or more data sources within the third party system 170. The information related to the at least one selected output may include information relating to a travel property. In some embodiments, the information relating to a travel property may include a price associated with the travel property, review data for the travel property, a geographical location of the travel property, and one or more amenity offerings associated with the travel property.

The method may include act, operation, or process 425, in which the provider computing system 105 generates a summary of the at least one selected output. The summary refers to a graphical user interface depicting the at least one selected output and information associated therewith. In operation, the at least one selected output includes at least two selections. The at least two selections may include at least two travel features, such as at least two properties, at least two experiences, etc. In one example, the at least two travel features are of the same category (e.g., properties versus airlines). The summary of the at least one selected output may be based on the information retrieved during process 420 related to the at least one selected output. The summary may include visual content and textual content (e.g., a picture(s) and associated textual information). For example, the summary of the at least one selected output may include a price associated with the at least one selected output (e.g., a picture of a travel property) and textual information relating to the at least one selected output, such as the price associated with the travel property, review data for the travel property, the geographical location of the travel property, one or more amenity offerings associated with the travel property, etc.

The method may include act, operation, or process 430, in which the provider computing system 105 provides a display of the summary generated during process 425. In particular and as described herein, the generated summary may be provided simultaneously with a conversation platform on a graphical user interface. The summary and the conversation platform may be displayed via a graphical user interface of the user device 140. In some embodiments, the client application 145 may generate the graphical user interface, populate a portion (a first portion) of the graphical user interface with the summary (i.e., based on information from the provider computing system) and another portion (a second portion) with the conversation platform. In this instance, the client application 145 may store one or more graphical user interface templates and populate them based on information from the provider computing system 105 based on the search query.

Figure 6A:
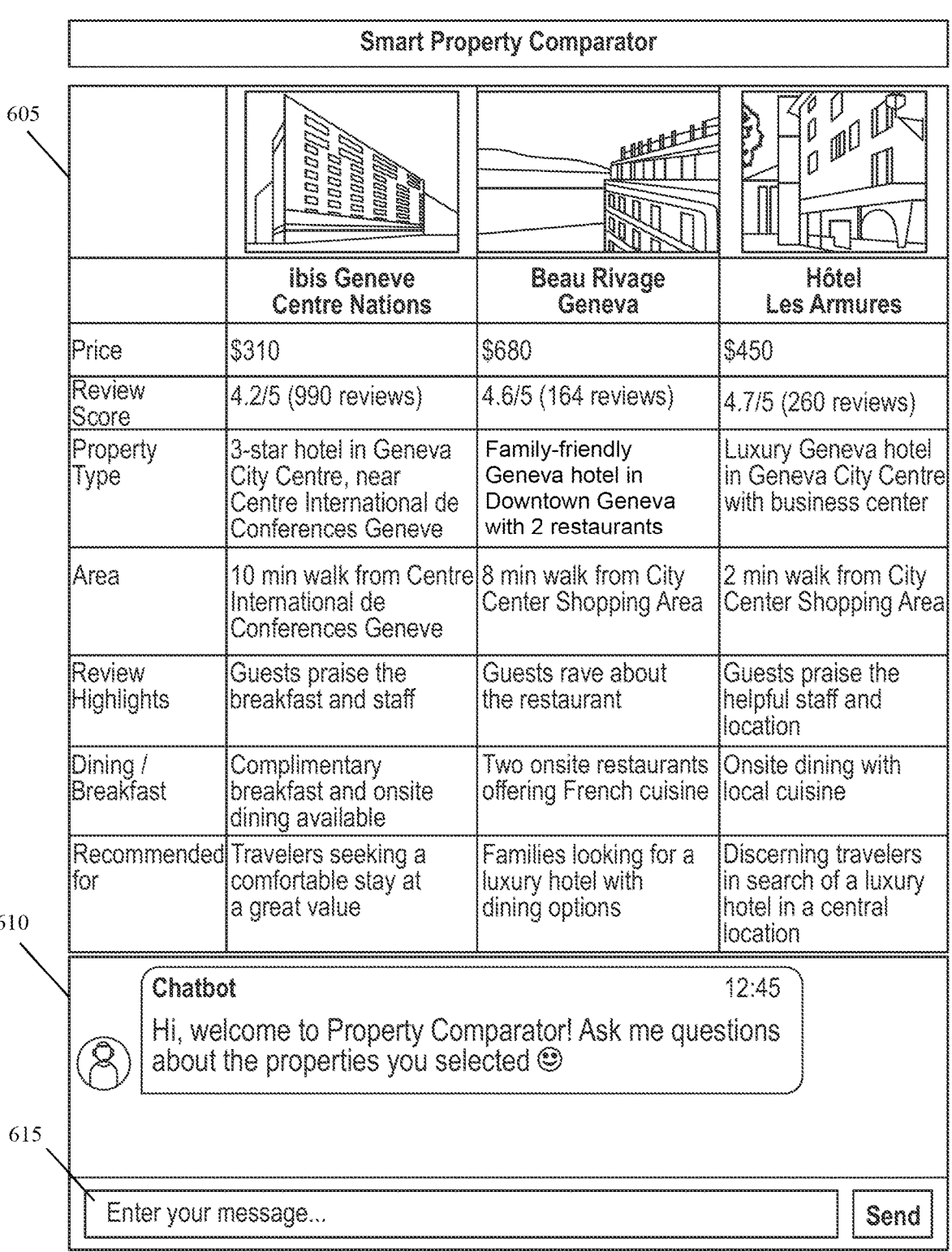
FIGS. 6A-6B depict a user interface provided to a user as part of the dynamic multifaceted comparison tool, according to one or more example embodiments.
Figure 6B:
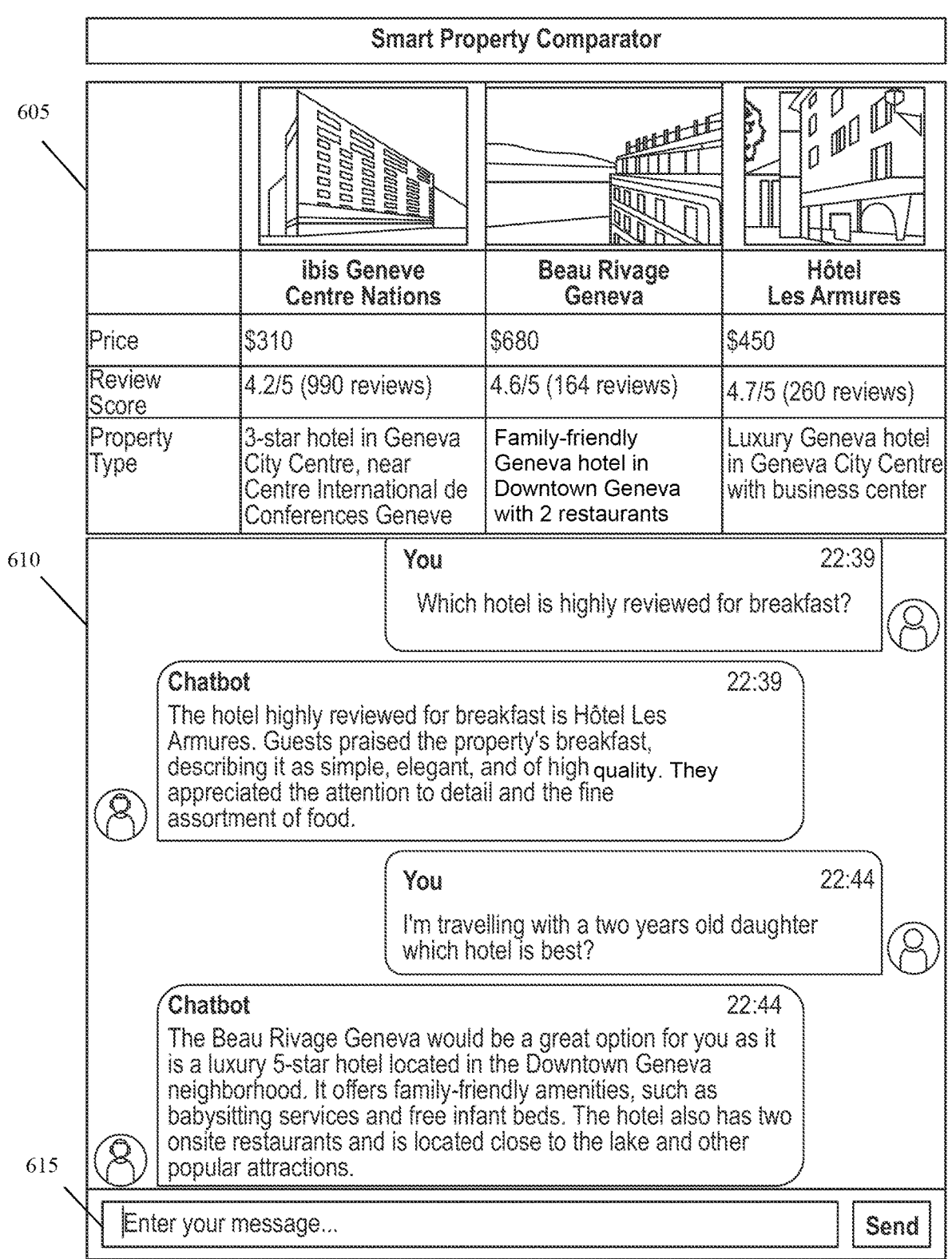

In some embodiments, the summary depiction may be formatted as a table (a tabular format). The tabular format may include at least one column, wherein each one of the at least one column relates to each one of the at least one selected output. For example, as shown in FIGS. 6A and 6B, each one of the at least one column may include a title associated with the at least one selected output relating to that column (e.g., "ibis Geneve Centre Nations," "Beau Rivage Geneva," "Hotel Les Armures," etc.) (i.e., travel property names). In some embodiments, each one of the at least one column may include an image associated with the at least one selected output relating to that column. The image may be a still photo representative of the travel property. In other embodiments, a dynamic image (e.g., a GIF, a video, etc.) may be used in place of the still photo.

The tabular format may include at least one row, wherein each one of the at least one row includes information related to each one of the least one selected output (e.g., price information, occupancy availability information, location, etc.). In some embodiments, the information included in each one of the at least one row may be the information retrieved during process 420. For example, as shown in FIGS. 6A and 6B, a first row in the tabular format may include a price associated with each one of the at least one selected output, a second row in the tabular format may include a review score associated with each one of the at least one selected output, a third row in the tabular format may include a geographical area associated with each one of the at least one selected output, and so on.

In some embodiments, provider computing system 105 may generate the summary depiction utilizing a dynamic row selection, whereby the at least one row is customizable based on the user accessing/using the user interface via the client application 145. That is, rather than generating at least one row including the same information between a plurality of summary depictions displayed to a plurality of users (e.g., each summary depiction of the plurality of summary depictions includes a price, a location, an availability, at least one amenity offering, and so on, associated with the at least one selected output included in each of the plurality of summary depictions), the provider computing system 105 may be configured to determine the at least one row of the summary depiction (e.g., table) based on one or more user-preferences. For example, the provider computing system 105 may be configured to determine, using the machine learning model 135 based on the training data 130, that a particular user prefers travel properties that offer complimentary breakfast. For that particular user, then, at least one row included in the summary depiction may include information related to the breakfast offerings available at each of the at least one selected output included in the summary depiction.

The provider computing system 105 may further be configured to, using the dynamic row selection, update the at least one row included in the summary depiction depending on a content of a conversation over a conversation platform, as described herein. For example, a first summary depiction presented to a user via a user interface (e.g., user interface 600*a* and/or user interface 600*b*) may include a plurality of rows including information related to a price, a location, an availability, and at least one amenity offering associated with the at least one selected output included in the summary depiction (or other features). The conversation over the conversation platform may include a textual input from a user (e.g., a textual input submitted via the input field 615 of user interface 600*a* and/or 600*b*) that states "I am traveling for a business trip to the United Nations." After receiving the textual input from the user via the conversation platform, the provider computing system 105 may be configured to update the summary depiction to include an additional row including information relating to a distance of each of the at least one selected output included in the summary depiction to the United Nations location. The provider computing system 105 may be configured to display the updated summary depiction, including the additional row, in real-time upon receiving the textual input from the user such that the user is not required to add an additional search parameter in a new search query.

The user device 140 may simultaneously display a conversation platform (e.g., conversation platform 610, as described below with reference to FIGS. 6A and 6B) with the display of the summary generated during process 425. The conversation platform is configured to enable a conversation between a conversational assistant (e.g., a chatbot, a virtual agent, a virtual assistant, etc.) and a user of the user device 140. The conversation platform refers to a virtual setting, space, environment, etc., over which messages may be exchanged between at least two parties, entities, users, etc. (e.g., between a user and a chatbot). The conversational assistant refers to a digital, electronic, virtual, computer-based, etc., program configured to simulate conversation between two humans over the conversation platform. The conversation enabled by the conversation platform may relate to the at least one selected output.

The method may include act, operation, or process 435, in which the user device 140 receives the display of the summary and the conversation platform provided by the provider computing system 105 during process 430. Upon receiving the display of the summary and the conversation platform during process 435, the user device 140 may be configured to render a user interface including the display of the summary and the conversation platform during act, operation, or process 440 of method 400. A user may compare one or more travel experiences from the summary based on the information included therewith and may engage in a conversation with the conversational assistant via the conversation platform, as described below with reference to method 500.

As an example operation of method 400, a user with an account held at the provider entity may log into the client application 145 using one or more credentials. Upon accessing the client application 145, the user device 140 (particularly, client application 145) may generate a user interface from which the user can initiate a search session. The user may initiate the search session by submitting a search query, such as "locate hotels in Geneva." In response, the user interface displayed via the user device 140 may present one or more hotels in Geneva. The user may browse the results and may select a predefined number (e.g., three) of the one or more identified hotels in Geneva. The provider computing system 105 may receive the selected three hotels in Geneva from the user device 140. The provider computing system 105 may retrieve information associated with the selected three hotels (e.g., a price associated with each of the three hotels in Geneva, review data associated with each of the three hotels in Geneva, a geographical area associated with each of the three hotels in Geneva, one or more amenities offered by each of the three hotels in Geneva, etc.). Typically, static information such as the geographical area and the one or more amenities may be stored in an internal database of the provider computing system 105, while dynamic information such as the price and the review data may be retrieved from a third-party database that includes real-time data associated with each of the properties. The third-party database may be associated with one or more third party computing systems (e.g., third party system 170) associated with one or more provider entities (e.g., one or more hotel providers). The dynamic information may be retrieved by the provider computing system 105 from the third-party database using at least one real-time API call.

The provider computing system 105 may generate a summary depiction/page (e.g., summary depiction 605, as described below with reference to FIG. 6A) including the information related to each of the selected three hotels in Geneva. Alternatively, the client application 145 may generate the summary depiction and populate the depiction with information from the provider computing system 105. The user device 140, via the client application 145, may provide a display of the summary and a conversation platform (e.g., conversation platform 610, as described below with reference to FIGS. 6A and 6B). In other embodiments, such as when the traveler/user provides the search query via a website, the provider computing system 105 may generate and provide the summary depiction and the conversation platform on its website in response to the search query. The user may observe the summary depiction and the conversation platform on the user device 140. From the summary depiction, the user can conduct a side-by-side comparison of each of the selected three hotels in Geneva to identify which of the three hotels best suits the user's individual needs. In this example, the user may be attending a conference at the United Nations, and so the user may prefer the hotel in close proximity to the United Nations. From the geographical area associated with each of the three hotels included in the summary, the user can identify which of the three hotels is closest to the United Nations. Additionally and beneficially, the user can engage in a conversation with a conversational assistant by interacting with the conversation platform while simultaneously viewing the summary depiction.

The user may interact with the conversation platform by submitting an input, such as a text entry into an input field (e.g., input field 615, as described below with reference to FIGS. 6A and 6B). In other embodiments, the conversation platform may interface with a microphone on the user device 140 so that the user may provide audible inputs. Then, through a speech-to-text program, as described below, the audible input may be converted to text and depicted on the graphical user interface alongside the summary depiction. The input may include additional information pertaining to the user's trip, for example, "Which hotel is best if I am travelling with a two-year old?" The conversational assistant may be configured to respond to the user's input based on retrieved information associated with each of the selected three hotels in Geneva. For example, the conversational assistant may indicate that one of the three hotels has family-friendly amenities, such as babysitting service and infant beds. Based on the information relating to the three hotels presented in the summary, paired with the assistive function of the conversation platform, the user can compare the three hotels via a single interface and identify which of the three hotels best suits the user's need for a family-friendly hotel near the United Nations.

The improved graphical user interfaces that combine the two disparate features of a summary page and a conversation platform enables two simultaneous functions beneficial to various functions (e.g., trip planning) from one user interface. When planning a trip, users often rely on a comparison between multiple properties (e.g., provided by the summary presented via the user interface) as well as on chatbot assistance. Therefore, having simultaneous access to the summary page and the chatbot feature from a single interface may prevent the user from having to access multiple applications, webpages, search sessions, etc. in order to obtain the benefit of the comparison between multiple properties and the chatbot assistant. These improved graphical interfaces save a user time because the user may access one interface that serves two simultaneous functions and improve bandwidth by reducing the number of systems that need to operate in order to provide the comparison and enable the conversation platform.

Figure 5:
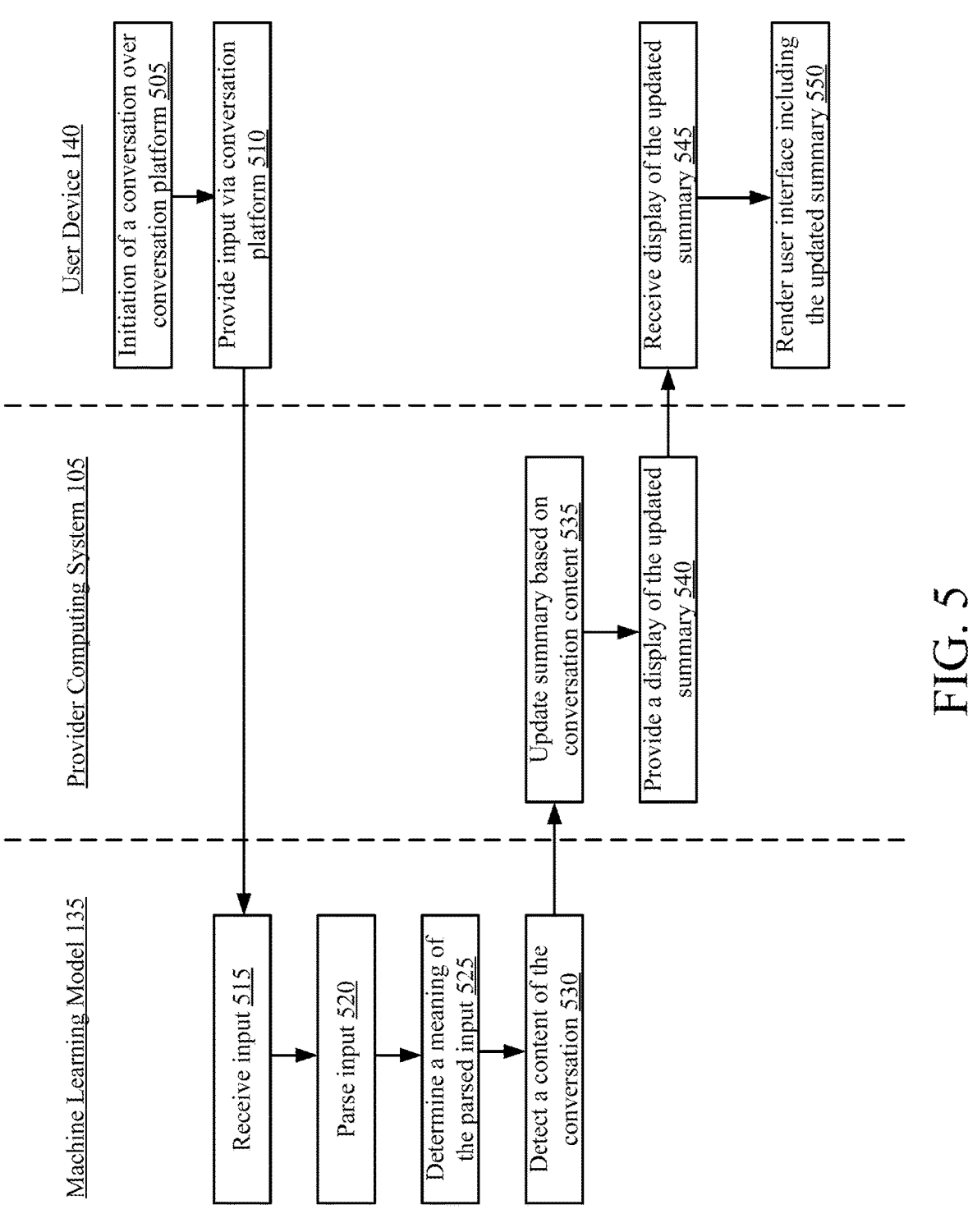
FIG. 5 depicts another method of providing a dynamic multi-faceted comparison tool using the system of FIG. 1, according to an example embodiment.

Referring now to FIG. 5, another method 500 of providing a dynamic multi-faceted comparison tool using the system of FIG. 1 is shown, according to an example embodiment. The method 500 may be built upon method 400, in some embodiments. Method 500 refers to a process for detecting a content of the conversation between the conversational assistant and the user via the conversation platform displayed via a user interface during method 400.

After the user device 140 renders the user interface including the summary and the conversation platform during process 440 of method 400, method 500 may begin with act, operation, or process 505 which includes initiation of a conversation via the conversation platform displayed via the user interface during method 400. For example, the conversation may be initiated upon the provider computing system 105 generating an automated message from a conversation assistant (e.g., chatbot, virtual assistant, virtual agent, etc.) and displaying the automated message via the conversation platform. The initial automated message may include a welcome message, an offer to assist, an introduction of the conversational assistant, and so on.

The method 500 may include act, operation, or process 510 in which the user device 140 receives an input (e.g., a text entry, a voice entry, etc.) from the user, and provides the input (or multiple inputs) via the conversation platform to the machine learning model 135 over the network 101. The user may submit at least one input (e.g., at least one text entry, at least one voice entry, etc.) via an input field (e.g., input field 615, as described below with reference to FIGS. 6A and 6B) included in the conversation platform. In some embodiments, the at least one input may include a message entered via the conversation platform following receipt of the automated message from the conversational assistant. The message entered via the conversation platform may be entered as a text entry (e.g., by typing text into the input field 615 of the user interface 600a, as described below) or as a voice entry (e.g., by speaking the message into a microphone of the user device 140). The input from the user may include additional search parameters relating to the search query, a request for additional information relating to the at least one selected output included in the summary presented via the user interface, and so on.

The machine learning model 135 may receive the input from the user device 140 during act, operation, or process 515 of method 500. In some embodiments, an audible input (e.g., a voice entry) may be converted into a text entry by the machine learning model 135. The machine learning model 135 may perform a speech-to-text conversion using an automatic speech recognition (ASR) model. The ASR model may be trained using audio recordings and corresponding textual transcriptions that are stored in the training data 130. The ASR model extracts one or more audio features (e.g., spectrograms, mel-frequency cepstral coefficients, other time-frequency representations, etc.) from the audible input. The ASR model includes feeding the one or more audio features into an acoustic model. The acoustic model may be based on deep neural networks (DNNs), convolutional neural networks (CNNs), and/or recurrent neural networks (RNNs). The acoustic model may predict an output including one or more phonemes and/or subwords corresponding to the one or more audio features. The output of the acoustic model may result in a textual transcription of the audible input. In some embodiments, the user device 140 may display the textual transcription of the audible input via a graphical user interface (e.g., user interface 600a, as described below).

The method 500 may include act, operation, or process 520 in which the machine learning model 135 parses the input received from the user via the conversation platform. The machine learning model 135 may parse the input using a tokenization method. In the tokenization method, the machine learning model 135 identifies one or more tokens from the input (e.g., from a text entry and/or from a textual transcription of a voice entry). The one or more tokens refers to a unit of input. The one or more tokens may be one or more phrases, words, sub-words (e.g., prefixes, suffixes, etc.), and/or characters included in the input. Once the machine learning model 135 tokenizes the input, each of the one or more tokens may be assigned a numerical representation that is configured to be applied to one or more algorithms of the machine learning model 135 (e.g., an algorithm configured to perform a semantic analysis, as described below with reference to process 525).

The method 500 may include act, operation, or process 525 in which the machine learning model 135 determines a meaning of the parsed input. The "meaning" of the parsed input refers to a determined definition regarding each unit of input (e.g., phrases, words, sub-words, etc.) identified in the parsed input. In some embodiments, the definition may be a plain English definition of each unit (e.g., each word or phrase) identified in the parsed input. For example, an input may recite "I am travelling on a business trip to the United Nations and need a place to stay." The machine learning model 135 may create tokens from words/phrases included in the input such as "business trip," "United Nations," and "place to stay." The machine learning model 135 may determine a definition (a "meaning") of each of the tokenized words/phrases (e.g., based on one or more definitions stored in the training data 130, retrieved from a dictionary, etc.). The machine learning model 135 may determine that "business trip" means that the user is travelling for a professional purpose, that "United Nations" means a location of a United Nations office (e.g., New York City, Geneva, Vienna, Nairobi, etc.), and "place to stay" means a travel accommodation (i.e., a hotel, a rental property, a resort, etc.).

In some embodiments, the machine learning model 135 may determine the meaning of the parsed input using one or more algorithms configured to perform a semantic analysis. The machine learning model 135 may perform the semantic analysis on the one or more tokens identified from the input during process 520. The semantic analysis may include utilizing an algorithm of the machine learning model 135 configured to identify one or more lexical items (e.g., hyponyms, metonymy, polysemy, synonyms, antonyms, homonyms, etc.) from the input. For example, if an input asks "Which hotel is best if I am travelling with a child?" the machine learning model 135 may tokenize the word "child" and the algorithm configured to perform the semantic analysis may identify "child" as a hyponym of "person," "kid" as a synonym of "child," "adult" as an antonym of "child," and so on.

The method 500 may include act, operation, or process 530 in which the machine learning model 135 detects a content (i.e., a purpose or intent) of the conversation between the user and the conversational assistant over the conversation platform based on the meaning(s) of the parsed input. The detected or determined "content" of the conversation refers to a determined intent or purpose regarding one or more inputs received via the conversation platform. The machine learning model 135 may determine the meaning associated with one or more words or phrases included in one or more inputs submitted by the user, as described above. Based on each of the meanings determined during process 525, the machine learning model 135 may detect the content of the conversation by combining the meanings associated with the parsed input from one or more inputs. In certain embodiments, the machine learning model 135 may also utilize a context of the conversation (e.g., a location of the user, a time of the conversation, etc.) to inform/determine the content/intent of the conversation. Continuing with the example above and regarding the input that recites "I am travelling on a business trip to the United Nations and need a place to stay," the machine learning model may combine the determined meanings of "business trip," "United Nations," and "place to stay" to detect or determine the content of the conversation as being a user searching for a hotel near the United Nations. By using a meaning and a content of the input(s), different search phrases/queries relative to the initial search query may be utilized by the provider computing system to enable more robust searches for a traveler.

In some embodiments, the machine learning model 135 may detect the content of the conversation based on a plurality of inputs. For example, after determining the meaning of "United Nations" from the input "I am travelling on a business trip to the United Nations and need a place to stay," the machine learning model 135 may determine that "United Nations" may refer to a multitude of geographical locations (e.g., Geneva, New York City, Vienna, Nairobi, etc.). The conversational assistant may response to the input with a follow-up question such as "Which United Nations location will you be travelling to?" The user may submit a second input via the conversation platform in response to the follow-up question that specifies Geneva as the United Nations location where the user is travelling to. The machine learning model 135 may, after receiving the second input, detect the content of the conversation as being a user searching for a hotel near the United Nations in Geneva. By detecting the content of the conversation based on a plurality of inputs, a user may add additional parameters to a search for a travel experience that suits all of the user's individual needs, even if those needs are not reflected in the initial search query.

The method 500 may include act, operation, or process 535 in which the provider computing system 105 updates the summary generated during process 425 of method 400 based on the content of the conversation detected during process 530. The provider computing system 105 may be configured to retrieve information related to the content of the conversation detected during process 530. In some embodiments, the information may be retrieved from the internal data sources (e.g., internal to the provider computing system) and/or the external data sources (from third-party computing systems 170), as described herein. The provider computing system 105 may retrieve information related to the content of the conversation and associated with the at least one selected output included in the summary generated during process 425 of method 400, as described above. The information may include text derived from one or more reviews (e.g., "This hotel was a great option for our family vacation," "This hotel offers the best breakfast in town," etc.), one or more amenity offerings available at the hotel (e.g., a playground, an infant bed, a waterpark, babysitting services, complimentary breakfast, an on-site café, etc.), and so on. The provider computing system 105 may then update the summary displayed via a graphical user interface of the user device 140 to include this information related to the content of the conversation and associated with the at least one selected output.

In some embodiments, the provider computing system 105 may be configured to retrieve information related to one or more travel experiences other than the at least one selected output included in the summary. The provider computing system 105 may retrieve information related to the content of the conversation from one or more data sources (e.g., the internal data sources and/or the external data sources, as described above) that include information related to a plurality of travel experiences. From the information related to the plurality of travel experiences, the provider computing system 105 may identify at least one travel experience associated with information related to the content of the conversation. For example, the provider computing system 105 may identify at least one additional travel experience with one or more reviews including text related to the content of the conversation, one or more amenity offerings related to the content of the conversation, and so on, that is not the at least one selected output received by the provider computing system 105 during process 415 of method 400. The provider computing system 105 may update the summary displayed via the graphical user interface of the user device 140 to include this at least one additional travel experience (e.g., by adding at least one additional column to a tabular format of the summary, wherein the additional column of the tabular format corresponds to the at least one additional travel experience). Alternatively or additionally, upon identifying the at least one additional travel experience, the conversational assistant may provide the at least one additional travel experience and information related to the content of the conversation to the user within a message delivered via the conversation platform. The method 500 may include act, operation, or process 540 in which the provider computing system 105 provides a display of the updated summary to the user device 140. The user device 140 receives the display of the updated summary during act, operation, or process 545. The method 500 may include act, operation, or process 550 in which the user device 140 renders a user interface including the updated summary such that a user of the user device 140 may engage with the user interface. In other embodiments, the client application 145 (or user device 140) may generate and provide the summary depiction itself.

By updating the summary displayed via the graphical user interface dynamically based on a user's interaction with the conversation platform, the user may receive additional information (e.g., details related to one or more travel experiences) and additional results (e.g., one or more travel experiences in addition to the at least one selected output included in the summary generated during process 425 of method 400) without submitting additional search queries. Because the summary and the conversation platform are displayed via one graphical user interface, and because the summary is dynamically updated to reflect the content of the conversation from the conversation platform, the user can submit additional questions, criteria, parameters, comments, etc. that would typically require an additional search query/ session via the conversation platform and receive a real-time response without departing from the graphical user interface.

As an example operation of method 500, upon generation of the summary and the conversation platform on a graphical user interface of the user device 140, the user may respond to an automated message from the conversational assistant. The user's response to the automated message may include a question relating to the information included in the summary depiction (e.g., "I am traveling on a business trip to the United Nations with a two-year old, which is best?"). From the question submitted by the user via the conversation platform, the machine learning model 135 may parse the text included in the question and tokenize the key words such as "business trip," "United Nations," and "two-year old." From the parsed text, the tokens may be applied to an algorithm of the machine learning model 135 configured to determine the meaning of the parsed text based on a semantic analysis. The semantic analysis may reveal that "business trip to the United Nations" means that the user is searching for a hotel within a close proximity to that United Nations and that the "two-year old" means that the user is searching for a family-friendly hotel. The machine learning model 135 may detect that the content of the conversation is a request for a family-friendly hotel within walking distance to the United Nations. The provider computing system 105 may identify the geographical location of each of the hotels included in the summary and compute a distance between each of the hotels and the United Nations. The provider computing system may also identify, for at least one of the hotels included in the summary, a user review that includes text such as "This hotel was great while travelling with three kids." The provider computing system 105 may update the summary displayed via the graphical user interface such that the updated summary includes the distance between each of the hotels and the United Nations as well as the user review that includes text relating to travelling with kids. By updating the summary presented to the user via the user device 140 to include the content of a conversation between the conversational assistant and the user, the user can perform a comprehensive comparison of the hotels included in the summary and determine which of the hotels best suits the user's individual needs (e.g., a family-friendly hotel within walking distance of the United Nations).

Referring now to FIG. 6A, the user device 140 (e.g., the client application 145) or the provider computing system 105 may be configured to generate a user interface 600a to be displayed on the user device 140, as depicted in FIG. 6A. In some embodiments, the user interface 600a includes a summary depiction 605 regarding at least one selected output. The summary depiction 605 refers to the summary generated by the provider computing system 105 during process 425 of method 400, as described above. In other embodiments, the client application 145 may generate the summary depiction; information included therein may be provided by the provider computing system 105. The user interface 600a refers to the user interface rendered by the user device 140 during process 440 of method 400, as described above. For example, the user interface 600a may include three hotels (e.g., "ibis Geneve Centre Nations," "Beau Rivage Geneva," "Hotel Les Armures," etc.) selected by a user in response to an initial search query.

The summary depiction 605 may include information related to each of the compared properties. In this way, the depiction 605 may include three hotels and include information, such as a price (e.g., $310, $680, $450, etc.), a review score (e.g., 4.2/5, 4.6/5, 4.7/5, etc.), a property description (e.g., "3-star hotel in Geneva City Centre, near Centre International de Conferences Geneva," "Family-friendly Geneva hotel in Downtown Geneva with 2 restaurants," "Luxury Geneva hotel in Geneva City Centre with business center," etc.), an area (e.g., "10 min walk from Centre International de Conferences Geneve," "8 min walk from City Center Shopping Area," "2 min walk from City Center Shopping Area," etc.), review highlights (e.g., "Guests praise the breakfast and staff," "Guests rave about the restaurant," "Guests praise the helpful staff and location," etc.), dining/breakfast amenities (e.g., "Complimentary breakfast and onsite dining available," "Two onsite restaurants offering French cuisine," "Onsite dining with local cuisine," etc.), recommended groups of travelers (e.g., "Travelers seeking a comfortable stay at a great value," "Families looking for a luxury hotel with dining options," "Discerning travelers in search of a luxury hotel in a central location," etc.), and so on.

The user interface 600a may include a conversation platform 610. The conversation platform 610 may be the conversation platform included in the display provided to the user device 140 during process 430 of method 400. The conversation platform 610 may include an automated message from a conversational assistant, chatbot, virtual agent, virtual assistant, etc. The automated message may include text such as "Hi, welcome to Property Comparator! Ask me questions about the properties you selected." The conversation platform 610 may include an input field 615. The input field 615 may be configured to receive an input from a user. The input from the user may include at least one of a textual input (e.g., the user can submit a textual message into the input field 615 by typing the input) or an audible input (e.g., the user can submit a voice message into the input field 615 by recording the input).

As shown in FIG. 6B, the user and the conversational assistant may be configured to engage in a conversation via the conversation platform 610 related to the information presented in the summary depiction 605. FIG. 6B includes the user interface 600a, the summary depiction 605, the conversation platform 610, and the input field 615, as described above with reference to FIG. 6A. FIG. 6B depicts a conversation between the user and the conversational assistant via the conversation platform 610. For example, the conversation may include the user submitting a textual input via the input field 615 that asks, "Which hotel is highly rated for breakfast?" Upon receiving the textual input from the user via the input field 615, the machine learning model 135 may parse the textual input, determine a meaning of the parsed textual input, and detect a content of the conversation, as described above with reference to method 500. In this example, the provider computing system 105 may be configured to transmit a response from the conversational assistant including information related to breakfast options available at each of the hotels included in the summary depiction 605. In some embodiments, the response from the conversational assistant may recite information included in the summary depiction 605 and/or information that is not included in the summary depiction 605. For example, the response from the conversational assistant may state "The hotel highly rated for breakfast is Hotel Les Armures. Guests praised the property's breakfast, describing it as simple, elegant, and of high quality. They appreciated the attention to detail and the fine assortment of food." In this example, the response elaborates on the information included in the summary depiction 605 by adding additional content from one or more reviews associated with the Hotel Les Armures. The additional content may be retrieved from the one or more data sources as described above with reference to process 420 of method 400.

In some embodiments, the machine learning model 135 may be a generative AI model, as described above with reference to FIG. 2. The generative AI model may be configured to provide one or more responses via the conversation platform 610 based on at least one prior interaction between a user and the provider computing system 105. In some embodiments, the generative AI model may provide the one or more responses based on one or more prior interactions associated with an account of the user engaged in the conversation via the conversation platform 610. For example, the generative AI model may identify a prior search query associated with the user account for a family-friendly travel property in Florida. The generative AI model, then, may provide one or more responses related to family-friendly travel experiences. In some embodiments, the generative AI model may provide the one or more responses based on one or more prior interactions associated with other accounts held at the provider entity. For example, the generative AI model may determine that users who travel to Miami largely book a travel property in one or more specific neighborhoods. In a conversation related to a search query for travel properties in Miami, then, the generative AI model may be configured to provide one or more responses related to travel properties in the one or more specific neighborhoods.

In some embodiments, the generative AI model may be trained using a large text corpus. The large text corpus refers to a generic set of training data retrieved from one or more sources such as text documents, websites, social media, and so on, among other materials. The trained generative AI model may be configured to predict subsequent tokens from a sequence of text, as described above with reference to FIG. 2. By predicting the subsequent tokens from the sequence of text, the generative AI model may be trained to learn a structure (e.g., one or more patterns, trends, etc.) and/or one or more semantics (e.g., one or more meanings, intents, purposes, etc.) related to the sequence of text. Therefore, the trained generative AI model may be configured to generate coherent and contextually relevant text by predicting the subsequent tokens in a given sequence of text.

Alternatively or additionally, the generative AI model may be fine-tuned using a domain-specific text corpus. The domain-specific text corpus refers to a set of training data specific to a domain/enterprise (e.g., the travel industry/area) including text documents, websites, social media, and so on, among other materials, related to the domain/enterprise. For example, in the context of a travel-related enterprise, a generative AI model may be fine-tuned using travel reviews, property descriptions, travel-related social media posts, and so on. The fine-tuned generative AI model may be configured to provide relatively accurate and contextually appropriate responses to one or more user inputs (e.g., an input submitted via input field 615 of a conversation platform). For example, during a conversation related to a search for a travel experience, the fine-tuned generative AI model may be configured to provide recommendations using a travel-specific text corpus, rather than using data related to another industry in the large text corpus. As described above with reference to FIG. 2, the generative AI model may include a neural network architecture such as a transformer model. In some embodiments, the transformer model includes a self-attention mechanism. The self-attention mechanism may cause the transformer model to weigh a relevance (e.g., a relevance with respect to the specific domain) relating to one or more parts (e.g., words, phrases, sub-words, etc.) of the sequence of text when predicting the subsequent tokens from the sequence of text. In some embodiments, the generative AI model receives the sequence of text as an input sequence and generates the predicted subsequent tokens as an output sequence. The neural network architecture may include a plurality of layers, as described above with reference to FIG. 3. In some embodiments, each layer of the plurality of layers may include a self-attention mechanism and a feed-forward neural network. Using this architecture, the generative AI model may be configured to process complex patterns in an input.

After receiving the response from the conversational assistant, the user may submit one or more additional inputs via the input field 615. The one or more additional inputs may relate to a previous context of the conversation (e.g., to breakfast options at each of the hotels included in the summary depiction 605) or may relate to a new topic. For example, the user may ask the conversational assistant about family-friendly hotels. The user may submit an input that asks, "I'm travelling with a two-year-old daughter, which hotel is best?" The machine learning model 135 may parse the input, determine a meaning of the parsed input, and detect a content of the conversation, as described herein. The conversational assistant may respond to the input from the user by indicating which of the hotels included in the summary depiction 605 may best most appropriate for a family (e.g., based on amenity offerings, location, review highlights, etc.). In some embodiments, the machine learning model 135 may be configured to detect the content of the conversation based on the meaning of a plurality of inputs received during a conversation over the conversation platform.

By displaying a summary page relating to at least one output selected by a user simultaneously with a conversation platform, the user may easily compare travel experiences from one user interface presented on a user device (e.g., user device 140). The summary page allows a user to compare key information (e.g., a price, a review score, a location, amenity offerings, etc.) associated with the at least one output selected by the user. By combining key information for multiple selected travel experiences all within one place (e.g., a table, a chart, a diagram, an array, etc.), the user saves time and improves bandwidth occupancy because the user does not have to initiate a separate search related to each of the multiple travel experiences, compare multiple tabs of a web browser, navigate between various mobile applications, and so on. Additionally, by introducing a conversation platform configured to enable a user to engage in a conversation with a conversational assistant related to the information presented in the summary page, the user can pose follow-up questions in response to receiving the information included in the summary page. With this conversation feature, the user can ask for additional information as it pertains to the individual needs and desires of the user. For example, a user may be searching for a family-friendly property, for a property accessible to those with disabilities, for a property within walking distance of a metro station, and so on. The user receives this additional information in real-time from the conversational assistant, thereby improving trip planning by enabling a user to receive pertinent information in real-time and perform a comparison between at least one travel experience from a single interface.

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

The implementations described herein have been described with reference to drawings. The drawings illustrate certain details of specific implementations that implement the systems, methods, and programs described herein. Describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. In a non-limiting example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more processors, ASICs, FPGAs, GPUs, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, in a non-limiting example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud-based server). To that end, a "circuit" as described herein may include components that are distributed across one or more locations.

An exemplary system for implementing the overall system or portions of the implementations might include general-purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard disks, optical disks, etc. In other implementations, the volatile storage media may take the form of RAM, TRAM, ZRAM, etc. Combinations of the above are also included within the scope of machine-readable media. In this regard, machine-executable instructions comprise, in a non-limiting example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. In a non-limiting example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementations," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A computing system, comprising:

a network interface configured to communicate with a user device;

at least one processing circuit coupled to the network interface, the at least one processing circuit comprising at least one processor and at least one memory, the at least one memory storing instructions therein that, when executed by the at least one processor, cause the at least one processor to:

receive, from the user device, at least one selected output, the at least one selected output selected from a plurality of outputs generated for display via the user device in response to a search query;

retrieve information related to the at least one selected output;

generate a summary of the at least one selected output based on the retrieved information related to the at least one selected output;

arrange the summary into a table, each column of the table related to each of the at least one selected output and each row of the table comprising the retrieved information related to each of the at least one selected output;

display, via a graphical user interface, the table of the at least one selected output simultaneously with a conversation platform, wherein the conversation platform is configured to enable a conversation between a conversational assistant and a user of the user device relating to the at least one selected output, and wherein the conversational assistant is configured to perform a comparison between each of the at least one selected output in response to a query and based on the retrieved information related to the at least one selected output; and update the table based on the conversation between the conversational assistant and the user of the user device.

2. The computing system of claim 1, wherein the instructions, when executed by the at least one processor, further cause the at least one processor to:

parse, using a machine learning model, an input received via the conversation platform;

determine a meaning of the parsed input; and detect a content of the conversation between the conversational assistant and the user of the user device based on the meaning of the parsed input.

3. The computing system of claim 2, wherein the instructions, when executed by the at least one processor, further cause the at least one processor to:

update the table displayed via the graphical user interface based on the detected content of the conversation between the conversational assistant and the user of the user device in real-time or in near real-time, and without receiving another search query from the user device.

4. The computing system of claim 2, wherein the input received via the conversation platform is a voice input.

5. The computing system of claim 4, wherein the instructions, when executed by the at least one processor, further cause the at least one processor to:

convert, using the machine learning model, the voice input to a text entry.

6. The computing system of claim 5, wherein the instructions, when executed by the at least one processor, further cause the at least one processor to:

display the text entry via the graphical user interface of the user device.

7. The computing system of claim 1, wherein the at least one selected output relates to a travel experience.

8. The computing system of claim 1, wherein the information related to the at least one selected output comprises information relating to a travel property including at least one of a price associated with the travel property, review data regarding the travel property, a geographical location of the travel property, or one or more amenity offerings associated with the travel property.

9. A computer-implemented method, comprising:

receiving, by a computing system and from a user device communicably coupled to the computing system, at least one selected output, the at least one selected output selected from a plurality of outputs generated for display via the user device in response to a search query;

retrieving, by the computing system, information related to the at least one selected output;

generating, by the computing system, a summary of the at least one selected output based on the retrieved information related to the at least one selected output;

arranging, by the computing system, the summary into a table, each column of the table related to each of the at least one selected output and each row of the table comprising the retrieved information related to each of the at least one selected output;

displaying, by the computing system via a graphical user interface, the table of the at least one selected output simultaneously with a conversation platform, wherein the conversation platform is configured to enable a conversation between a conversational assistant and a user of the user device relating to the at least one selected output, and wherein the conversational assistant is configured to perform a comparison between each of the at least one selected output in response to a query from the user and based on the retrieved information related to the at least one selected output; and updating, by the computing system, the table based on the conversation between the conversational assistant and the user of the user device.

10. The method of claim 9, further comprising:

parsing, by the computing system using a machine learning model, an input received via the conversation platform;

determining, by the computing system, a meaning of the parsed input; and detecting, by the computing system, a content of the conversation between the conversational assistant and the user of the user device based on the meaning of the parsed input.

11. The method of claim 10, further comprising:

updating, by the computing system, the table displayed via the graphical user interface based on the detected content of the conversation between the conversational assistant and the user of the user device in real-time or in near real-time, and without receiving another search query from the user device.

12. The method of claim 10, wherein the input received via the conversation platform is a voice input.

13. The method of claim 12, further comprising:

converting, by the computing system using the machine learning model, the voice input into a text entry.

14. The method of claim 13, further comprising:

displaying, by the computing system, the text entry via the graphical user interface of the user device.

15. The method of claim 9, wherein the at least one selected output relates to a travel experience.

16. The method of claim 9, wherein the information related to the at least one selected output comprises information relating to a travel property including at least one of a price associated with the travel property, review data regarding the travel property, a geographical location of the travel property, or one or more amenity offerings associated with the travel property.

17. A non-transitory computer-readable medium having computer-executable instructions embodied therein that, when executed by at least one processor of a provider computing system, cause the provider computing system to perform operations comprising:

receiving, from a user device, at least one selected output, the at least one selected output selected from a plurality of outputs generated for display via the user device in response to a search query;

retrieving information related to the at least one selected output;

generating a summary of the at least one selected output based on the retrieved information related to the at least one selected output;

arranging the summary into a table, each column of the table related to each of the at least one selected output and each row of the table comprising the retrieved information related to each of the at least one selected output;

displaying, via a graphical user interface, the table of the at least one selected output simultaneously with a conversation platform, wherein the conversation platform is configured to enable a conversation between a conversational assistant and a user of the user device relating to the at least one selected output, and wherein the conversational assistant is configured to perform a comparison between each of the at least one selected output in response to a query from the user and based on the retrieved information related to the at least one selected output; and updating the table based on the conversation between the conversational assistant and the user of the user device.

18. The non-transitory computer-readable medium of claim 17, wherein the operations further comprise:

parsing, using a machine learning model, an input received via the conversation platform;

determining a meaning of the parsed input;

detecting a content of the conversation between the conversational assistant and the user of the user device based on the meaning of the parsed input; and updating the table displayed via the graphical user interface based on the detected content of the conversation between the conversational assistant and the user of the user device in real-time or in near real-time, and without receiving another search query from the user device.

* * * * *